Figure 1:
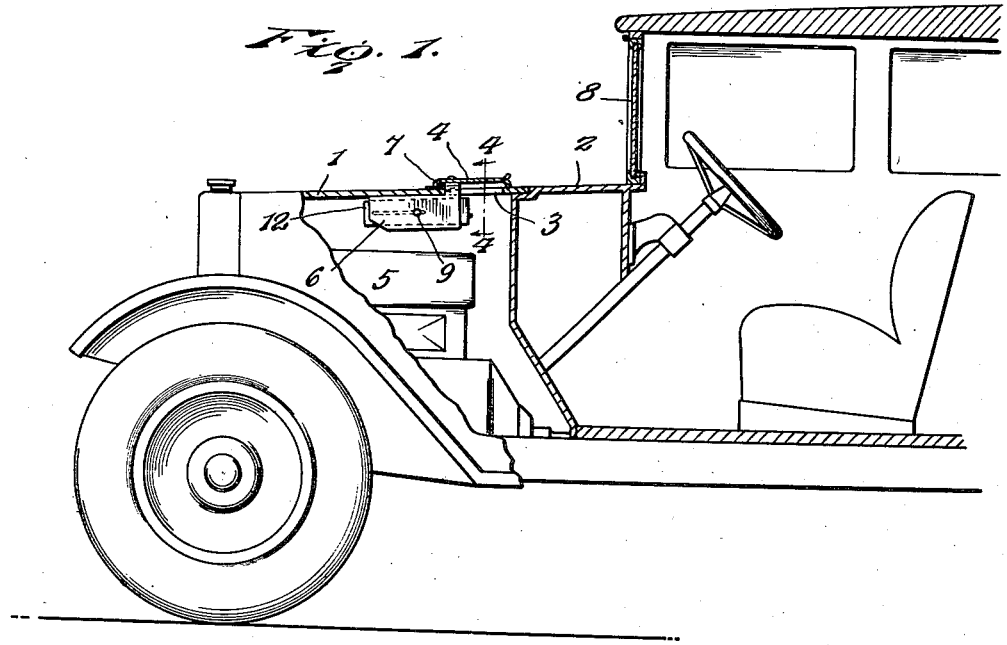

Aug. 9, 1932.  A. R. GREENE  1,870,726
WINDSHIELD HEATER
Filed June 8, 1931  2 Sheets-Sheet 1

Inventor
A. R. Greene.
By Lacey & Lacey, Attorneys

Aug. 9, 1932. A. R. GREENE 1,870,726
WINDSHIELD HEATER
Filed June 8, 1931 2 Sheets-Sheet 2
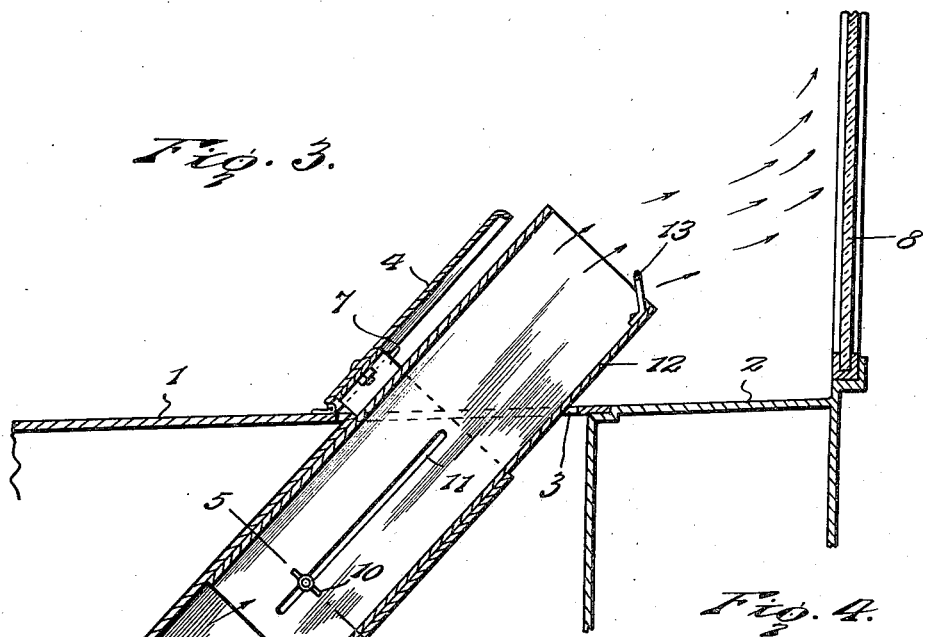
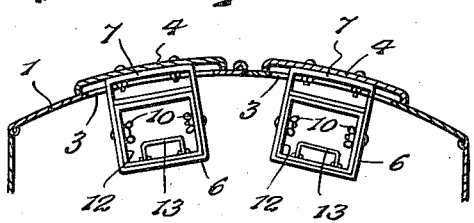
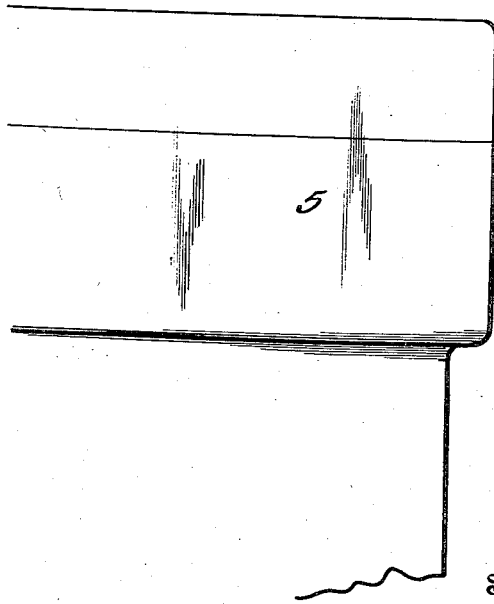
Inventor
A. R. Greene.
By Lacy & Lacy,
Attorneys Patented Aug. 9, 1932

1,870,726

UNITED STATES PATENT OFFICE

ARTHUR R. GREENE, OF FORT DODGE, IOWA

WINDSHIELD HEATER

Application filed June 8, 1931. Serial No. 542,903.

The object of this invention is to provide a simple, inexpensive and easily manipulated device which may be readily applied to an automobile and by which heated air may be directed against the windshield of the automobile to prevent the formation of ice thereon or the deposit of snow in inclement weather. The invention is illustrated in the accompanying drawings and will be hereinafter first fully described and then more particularly defined in the appended claims.

Figure 2:
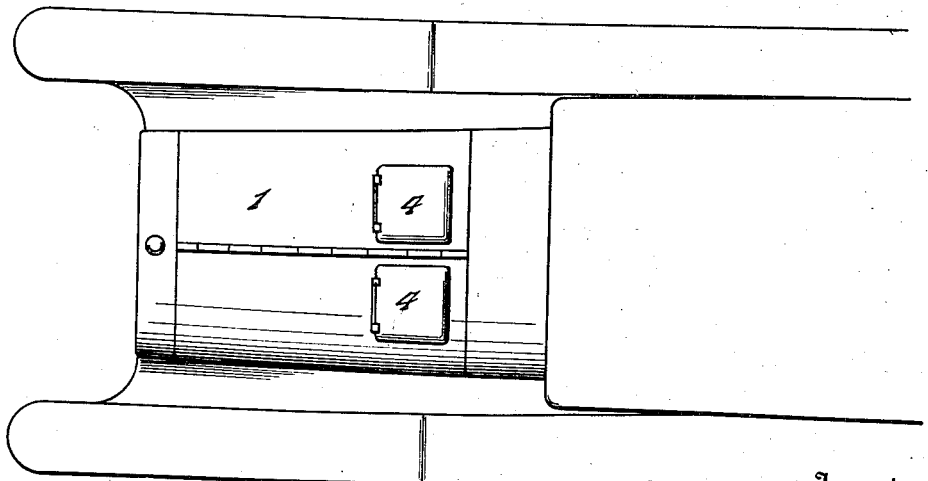

In the drawings:

Figure 1 is a sectional elevation of an automobile having the invention applied thereto, Fig. 2 is a top plan view of the same, Fig. 3 is an enlarged longitudinal section through the attachment, showing the same in operative position, Fig. 4 is an enlarged transverse section on the line 4—4 of Fig. 1, and Fig. 5 is a detail section on the line 5—5 of Fig. 3.

The automobile may be of any known or approved design and includes the usual hood 1 and cowl 2. The hood is illustrated as having openings 3 formed therethrough adjacent its rear end, and hingedly mounted upon the hood, adjacent the forward sides of said openings, are doors 4 which normally rest upon the hood over the openings so as to cover the same and prevent the passage of air therethrough, it being understood that the hood extends over and forms a housing for the engine 5 which drives the vehicle. Disposed within the space below the hood and above the engine is a tubular casing 6 which is provided at its rear end and upon its upper side with a bracket or extension 7 whereby it may be firmly secured to the respective door 4 to be carried thereby and follow the opening or closing movement of the door. The tubular casing 6 is open at both ends and normally lies against the top of the hood, with the door 4 in closed position, as shown in Fig. 1, and the rear end of the tube is immediately adjacent and below the opening 3 through the hood. If the door 4 be swung upwardly to open position, as shown in Fig. 3, the tube will be correspondingly rocked so that its front end will be swung downwardly to a point immediately above the engine and its rear end will be presented to the opening 3 through the hood, whereupon the hot air rising from the engine will flow through the tube and pass upwardly through the opening 3 and then will be deflected by the door or by the natural draft created by the travel of the vehicle to play upon the windshield, indicated at 8. It will thus be seen that the front side of the windshield will be subjected to the action of heated currents which will prevent the accumulation of snow and the formation of ice thereon. The forward end of the tube is beveled or cut away, as clearly shown in Fig. 3, to avoid possible impact with the engine and provide a larger opening for the admission of air to the tube.

To increase the sphere of usefulness of the device, the tubular casing or body is preferably telescopic in construction and, to this end, the sides of the body are equipped with set bolts 9 and wing nuts 10 thereon, the set bolts passing through longitudinal slots 11 in the opposite sides of an inner tube 12 which fits closely but slidably within the outer tube 6, as shown and as will be understood. At its rear end a handle 13 is provided upon the inner tube 12 so that the inner tube may be easily adjusted longitudinally of the outer tube in an obvious manner and, when properly set, may be secured in the set position by turning the wing nuts 10 home against the sides of the tube. Should the weather be very inclement, or the vehicle be moving through a storm, the door 4 will be raised to open position, shown in Fig. 3, and the inner tube may then be drawn upwardly and rearwardly so that the exit for the heated currents will be brought closer to the windshield and, consequently, will more effectually act thereon to prevent the undesired accumulations and maintain a clear vision for the chauffeur.

It will be noted on reference to the drawings that the device is exceedingly simple and compact and may be readily applied to the hood of any motor vehicle at slight expense. When the hood is divided centrally, as illustrated in the accompanying drawings, the device will be provided in duplicate, one device being fitted in each section of the hood, and this arrangement will keep the entire area of the windshield clear, but it will be understood that, if preferred, a single device may be provided at the center of the hood.

It will also be understood that by rocking the tube to the position shown in Fig. 3, an increased circulation of air for cooling the motor may be set up in hot weather.

Having thus described the invention, I claim:

1. The combination with an automobile hood having an opening therethrough, of a cover for said opening mounted upon the hood, and a tubular body carried by said cover and disposed under the hood with its rear end adjacent the opening in the hood whereby if the cover be raised the body will be set to direct hot air from the engine of the automobile through the opening in the hood to play upon the automobile windshield.

2. An attachment for automobiles consisting of a tubular body having both ends open, and a cover secured to the rear end of the body whereby when the cover is disposed over an opening through the hood of an automobile the tubular body will be disposed under the hood with its rear end immediately adjacent the opening therethrough.

3. An attachment for automobiles consisting of a cover for an opening through the automobile hood, and an extensible tubular body secured to the under side of said cover whereby when the cover is in closed position the tubular body will be disposed under the hood with its rear end immediately adjacent the opening therethrough.

4. An attachment for automobiles consisting of a cover adapted to be secured upon an automobile hood to close an opening therethrough, a tubular body having both front and rear ends open and provided at its rear end with a bracket to be secured to the under side of the cover whereby when the cover is in closed position the tubular body will be disposed under the hood with its rear end adjacent the opening therethrough, an inner tube slidably fitted within the tubular body and adapted to project through the rear end thereof and provided in its sides with longitudinal slots, and set bolts mounted in the sides of the tubular body and extending through said slots whereby the inner tube may be secured in a set position relative to the tubular body.

In testimony whereof I affix my signature.

ARTHUR R. GREENE. [L. S.]